United States Patent
Juda

(10) Patent No.: US 7,261,959 B2
(45) Date of Patent: Aug. 28, 2007

(54) METHODS OF GENERATING OXYGEN FROM AIR VIA AN ALKALI SUPEROXIDE

(76) Inventor: Walter Juda, 12 Moon Hill Rd., Lexington, MA (US) 02173

( * ) Notice: Subject to any disclaimer, the term of this patent is extended or adjusted under 35 U.S.C. 154(b) by 181 days.

(21) Appl. No.: 11/023,176

(22) Filed: Dec. 28, 2004

(65) Prior Publication Data

US 2006/0140850 A1  Jun. 29, 2006

(51) Int. Cl.
*C01B 13/02* (2006.01)
*C01B 15/043* (2006.01)
*H01M 8/04* (2006.01)

(52) U.S. Cl. .................. 429/17; 423/579; 423/581
(58) Field of Classification Search ........... 423/579, 423/581; 429/17
See application file for complete search history.

(56) References Cited

U.S. PATENT DOCUMENTS

| | | | | |
|---|---|---|---|---|
| 1,124,304 A | * | 1/1915 | Danckwardt | ............... 423/579 |
| 4,089,938 A | * | 5/1978 | Turner | ........................ 423/579 |
| 4,397,833 A | * | 8/1983 | Doetsch et al. | ............. 423/581 |
| 4,521,398 A | * | 6/1985 | Erickson | ..................... 423/579 |
| 4,526,775 A | * | 7/1985 | Cassano | ..................... 423/579 |
| 4,529,577 A | * | 7/1985 | Chen et al. | ................. 423/351 |
| 4,617,182 A | * | 10/1986 | Brown et al. | ............... 423/579 |

OTHER PUBLICATIONS

Il'ya Ivanovich Vol'nov, "Peroxides, Superoxides, and Ozonides of Alkali and Alkaline Earth Metals", Plenum Press, New York (1966), pp. 105 and 112, no month.*

* cited by examiner

*Primary Examiner*—Wayne A. Langel
(74) *Attorney, Agent, or Firm*—Rines and Rines

(57) ABSTRACT

Novel methods of air-oxidizing a molten alkali hydroxide at least partially to superoxide state and then reversing the reaction to obtain nitrogen-free oxygen, and then regenerating the molten hydroxide for repeated use, providing for the generating of concentrated oxygen from air.

10 Claims, No Drawings

METHODS OF GENERATING OXYGEN FROM AIR VIA AN ALKALI SUPEROXIDE

FIELD

The present invention relates generally to the generation of concentrated oxygen from air.

BACKGROUND

More specifically, the invention relates to an improved method of generating oxygen from air by air-oxidizing a suitable molten alkali hydroxide at least partially to superoxide and subsequently reversing the reaction, thereby obtaining nitrogen-free oxygen and regenerating the molten hydroxide.

Concentrated oxygen with none or little of the air's nitrogen is now widely in use and holds promise, if generated at low cost, for such applications as auto-thermal hydrogen generation from fossil fuels and for use as fuel cell cathode feeds and the like. Presently, relatively expensive cryogenic separation of the air's predominantly oxygen and nitrogen is widely practiced. Defining, for short, a "frigorie" as a negative calorie (i.e. the amount of heat necessary to be removed to cool one gram of water at 15° C. to 1° C.), all other things being equal, heat input is preferable to cooling, because frigories are significantly more expensive than calories. One principle of a known heating technique has involved a selective chemical oxygen acceptor at a moderately elevated temperature and releasing oxygen therefrom at a higher temperature, By way of such examples, the prior art has illustrated the principle of extracting the oxygen from air as early as in 1897 (E. B. Stuart's U.S. Pat. No. 588,615) by air oxidizing "a manganate and a neutral salt capable of fusing and remaining in permanent liquid form" (such as a salt, e.g. a chloride or sulfate) and "subjecting steam" thereto. Similarly, L. G. Jenness's U.S. Pat. No. 2,486,530 (1942} relies for the same purpose on the reversible reaction

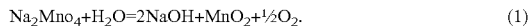

$$Na_2MnO_4 + H_2O = 2NaOH + MnO_2 + \tfrac{1}{2}O_2. \quad (1)$$

S. A. Guerrieri's U.S. Pat. No. 3,310,381, as another example, describes oxidizing barium oxide to peroxide, as in the range of 500° C. to about 720° C., and removing high purity oxygen from the peroxide; for example, in the range of 700° to about 850° C. Here, factors such as corrosion, slow kinetics and incomplete separation have, however, been serious drawbacks.

Low cost potassium superoxide is also a well known oxygen donor which has the important advantage over the above "heat-reversible" oxides that water liberates its oxygen rapidly even at room temperature, reverting $KO_2$ back to $2KOH$.

The syntheses of potassium superoxide, $KO_2$, and cesium superoxide, $CsO_2$, by oxygen in their molten hydroxides are well known in the prior art, as shown in "Peroxides, Superoxides, and Ozonides of Alkali and Alkaline Earth Metals" by Il'ya Ivanovich, (Translated from Russian by J. Woroncow; Edited by A. W. Petrocelli), Plenum Press, New York, 1966, pages 105 and 112, respectively. The equilibria at varying temperatures of the endothermic reaction

$$2KOH + 1.5O_2 = 2KO_2 + H_2O, \quad (2)$$

have been published by Von Hermann Lux, Rudolf Kuhn and Titus Niedermann (Zeitschrift fur anorganische Chemie, Vol. 298, 285-301), showing increasing peroxide concentrations up to about 600° C., low KOH amounts relative to oxygen flow rates and low steam concentrations. (The lowering of superoxide generation above 600° C. has been attributed to beginning decomposition.) Of special relevance to the present invention is the finding in this publication that the oxidation rates are in the order of many hours to reach equilibrium; this being further aggravated when air is used in lieu of oxygen, as hereinafter proposed for the purposes of the present invention.

With respect to improving the oxidation kinetics, reference is made to U.S. Pat. No. 3,471,332 (1969) to R. J. Allen, R. L. Novak and H. G. Petrow. It describes the catalytic enhancement by, for example, oxides of manganese, iron and cobalt, of the rates of cathodic oxidation of molten KOH—containing electrolyte of a fuel cell.

As later more fully detailed, this invention makes use of such molten alkali hydroxide(s) in a novel method of generating concentrated oxygen from air by at least partially oxidizing the molten alkali hydroxide to superoxide, then reversing the reaction to obtain nitrogen-free oxygen, and then regenerating the molten hydroxide.

OBJECTS OF INVENTION

The principal object of the invention is to provide such a new and improved method of generating concentrated oxygen not subject to the limitations of the prior art above discussed and other limitations.

A further object is to provide such a new method involving accelerating by catalysis and chemically enhancing toward completion, the air-oxidation of molten alkali hydroxides such as KOH in accordance with reaction (2) above, (also, similarly, that of CsOH and RbOH), and rapidly removing nitrogen-free oxygen therefrom by the reverse reaction utilizing liquid water or steam, thereby reconstituting the hydroxide for subsequent repeat of said air oxidation.

It is thus a further object of the invention to thermally reconstitute the agent providing said chemical enhancement.

Still a further object involves the integrations of controlled nitrogen-free oxygen/water mixtures in auto-thermal steam-reforming of fossil fuels (coal, hydrocarbons and derivatives thereof) and as cathodic oxidants for fuel cells and the like.

Other and further objects will be explained hereinafter and are more particularly delineated in the appended claims.

In summary, however, from perhaps its most generic view point, the invention embraces a method of generating oxygen from air that comprises air-oxidizing a molten alkali hydroxide at least partially to superoxide state, reversing the reaction to obtain nitrogen-free oxygen, and regenerating the molten hydroxide.

Preferred embodiments and best modes of the process are hereinafter set forth in detail.

The invention can be described without any drawings.

DESCRIPTION OF PREFERRED EMBODIMENTS

Broadly, a preferred important implementation of the invention generates oxygen from air by contacting, for example, carbon dioxide-free air with a molten hydroxide/lime mixture comprising one of potassium hydroxide, cesium hydroxide and rubidium hydroxide, preferably in the presence of an oxidation catalyst such as manganese oxide, iron oxide, cobalt oxide or the like, at an elevated temperature as later described, thereby generating an alkali superoxide and calcium hydroxide therein, and subsequently reacting the superoxide with water, thereby reforming molten hydroxide and evolving nitrogen-free oxygen therefrom.

The air ca. 350 ppm carbon dioxide can readily be removed, for example by lime, (with perhaps some NaOH) preferably preceding air contact with the molten hydroxide, or calcium carbonate can be formed gradually in situ in the molten hydroxide and must then be either discarded upon excessive slowdown of superoxide formation or separated periodically from the alkali hydroxide.

The preferred alkali hydroxide of the invention is potassium hydroxide and a typical temperature range for the superoxide formation is between about 350° C. and 600° C. Subsequently, a substantially stoichiometric amount of steam is contacted with the superoxide reforming the hydroxide and generating the nitrogen-free oxygen; or a controlled excess of steam is applied yielding a steam/oxygen mixture suitable, by way of examples, in auto-thermal steam-reforming of hydrocarbons.(including natural gas) and derivatives thereof (e.g. alcohols) and as cathodic oxidants in fuel cells.

One important aspect of the present invention is the enhancement of the extent of superoxide formation by the in situ removal, preferably by lime, (CaO), of the water formed in the endothermic potassium superoxide generating reaction (2) above, which now becomes the exothermic reaction

$$1.5O_2 + 2KOH + CaO = 2KO_2 + Ca(OH)_2. \qquad (3)$$

Further, the calcium hydroxide product of equation (3) is subject to dehydration by heat (above 580° C.) subsequent to the oxygen generation, thereby reconstituting the KOH/CaO mixture.

Oxygen-rich molten alkali hydroxides need to be contained in corrosion-resistant equipment. Among metals, nickel or a nickel-rich alloy such as Hastelloy bearing a strongly adherent nickel oxide coating are obviously more cost-effective examples of suitable containers than silver or gold. In any case, with respect to acceptable capital cost of the equipment, it is very important to attain rapid reactions and high levels of KOH conversion to minimize equipment weights and volume.

Thus, yet another important aspect of the invention contributing thereto is to increase the air/molten KOH contact area as well as the oxygen concentration by supplying compressed air in a sparging injection system.

EXAMPLE 1

A first experimental example demonstrating the rapid and substantial generation of an alkali superoxide by air-oxidizing a molten alkali hydroxide is readily carried out in a covered nickel or Hastelloy crucible, the cover being provided with a sparging tube and with an exhaust tube. Molten KOH admixed with CaO in substantially stoichiometric amounts [cf reaction (3) above] and with manganese oxide catalyst (e.g. in amount of 0.5.% of the weight of KOH) is heated to the temperature range of 400° C.-550° C. Fed thereto is then a controlled amount of carbon dioxide-free air, compressed e.g. to five atmospheres, through the sparging tube which bears a bottom plug of sintered nickel or Hastelloy having a pore size controlled to maintain the temperature within the range. Timing of the superoxide formation in this first step is readily determined when the oxygen content of the depleted air exhaust shows an unusual increase. The air flow is then stopped and steam is admitted through the sparging tube, reforming KOH and releasing the nitrogen-free oxygen product though the exhaust tube in this second step. Finally, upon cessation of oxygen evolution, the remaining mixture of potassium hydroxide and calcium hydroxide (as well as the manganese oxide catalyst) can now be regenerated in a third step by heating it to, for example, 600° C., at which temperature the calcium hydroxide loses water, thus reforming the lime.

EXAMPLE 2

The same procedure of Example 1 can be used when substantially oxygen-free nitrogen is the preferred product. Now the pressurized air supply is stopped when the oxygen content of the exhaust reaches a predetermined low value of, for example 3%. This residual oxygen in the nitrogen is reacted with hydrogen on a catalyst forming water, which in turn is condensed thus resulting in oxygen-free nitrogen.

EXAMPLE 3

In a further experiment, a controlled amount of excess steam is used to remove the nitrogen-free oxygen from the superoxide in carrying out the second step of Example 1, thereby generating a steam/oxygen mixture directly applicable to catalytic auto-thermal steam reforming of e.g. natural gas. Similarly, appropriate mixtures with different controlled ratios of steam to oxygen are readily prepared in this manner for direct auto-thermal reforming of other fossil fuels and derivatives including gaseous and gasified hydrocarbons, syn gas, methanol and ethanol.

EXAMPLE 4

In still another experiment the superoxide steam-liberated oxygen, with or without some excess steam, is used as an advantageous cathodic feed to a high temperature (exceeding 600° C.) solid oxide fuel cell, providing enhanced performance over an air feed. Here the fuel cell waste heat is used to regenerate the lime by dehydration of the calcium hydroxide. Similarly, the steam/oxygen mixture is an excellent cathodic feed to the molten alkali hydroxide fuel cells (e.g. operating at 500° C.) described, for example, in U.S. Pat. Nos. 3,407,094 and 3,407,095 (1968). Here, the superoxide and steam/oxygen generating steps are carried out at the fuel cell temperature, i.e. typically 500° C. Periodic extra heating to about 600° C. by fuel combustion is then required to dehydrate the calcium hydroxide back to lime. The hot steam evolved in this regeneration is then advantageously mixed with the cooler anodic fuel.

EXAMPLE 5

In yet a further experiment, the first-named superoxide rich mixture is reacted with liquid water, generating an advantageous cathodic feed for PEM fuel cells as well as for low temperature alkaline fuel cells, particularly in conjunction with portable fuel cells in the low wattage range.

Experimental conditions, including but not limited to temperatures, pressures of gases and steam and reactant proportions are readily varied by those skilled in the art to arrive at optimal operations depending on the applications.

Further modifications will also occur to those knowledgeable in this field, and such are considered to fall within the spirit and scope of the invention as defined in the appended claims.

What is claimed is:

1. A method of generating oxygen from air that comprises air-oxidizing a molten alkali hydroxide at least partially to superoxide state, said alkali hydroxide being selected from the group consisting of potassium hydroxide, cesium hydroxide and rubidium hydroxide, reversing the reaction to obtain nitrogen-free oxygen, and regenerating the molten hydroxide by utilizing liquid water or steam to rapidly remove nitrogen-free oxygen.

2. The method of claim 1 wherein lime (CaO) is added to said hydroxide thereby enhancing the extent of superoxide formation by in situ removal as by the lime of the water formed in the endothermic superoxide generating reaction which turns into an exothermic reaction producing calcium hydroxide ($Ca(OH)_2$).

3. The method of claim 2 wherein the calcium hydroxide is dehydrated by heat subsequent to the oxygen generation, thereby reconstituting the molten hydroxide-lime mixture.

4. The method of claim 1 wherein a substantially stoichiometric amount of steam is contacted with the superoxide reforming the hydroxide and generating the nitrogen-free oxygen.

5. The method of claim 1 wherein the air-oxidizing is carried out in a corrosion-resistant covered crucible as of nickel or a nickel-rich alloy bearing an adherent nickel oxide coating.

6. The method of claim 1 wherein the removal of nitrogen-free oxygen from the superoxide is carried out by excess steam, thereby generating a steam/oxygen mixture for catalytic auto-thermal steam reforming of natural gas and other fossil fuels and derivatives thereof.

7. The method of claim 1 wherein the superoxide steam-liberated oxygen is applied to the cathodic feed of high temperature solid oxide and molten alkali hydroxide fuel cells.

8. The method of claim 1 wherein the superoxide mixture is reacted with liquid water to generate a cathodic feed for one member selected from the group consisting of PEM fuel cells and low-temperature alkaline fuel cells.

9. The method of claim 1 wherein compressed air is injected into the molten alkali hydroxide.

10. The method of claim 9 wherein the pressurized air is stopped when the oxygen content reaches a few percent, and residual oxygen is catalytically reacted with hydrogen to form water which, in turn, is thereupon condensed resulting in oxygen-free nitrogen.

* * * * *